April 23, 1968  L. G. TURK ET AL  3,378,882

LOADER FOR TIRE CURING PRESS

Filed April 1, 1965  5 Sheets-Sheet 1

INVENTORS.
LEONARD G. TURK
ERNEST S. ULM
BENJAMIN STOYANOV
BY
Oberlin, Maky & Donnelly
ATTORNEYS April 23, 1968  L. G. TURK ET AL  3,378,882

LOADER FOR TIRE CURING PRESS

Filed April 1, 1965  5 Sheets-Sheet 2

INVENTORS.
LEONARD G. TURK
ERNEST S. ULM
BENJAMIN STOYANOV
BY
Oberlin, Maky & Donnelly
ATTORNEYS

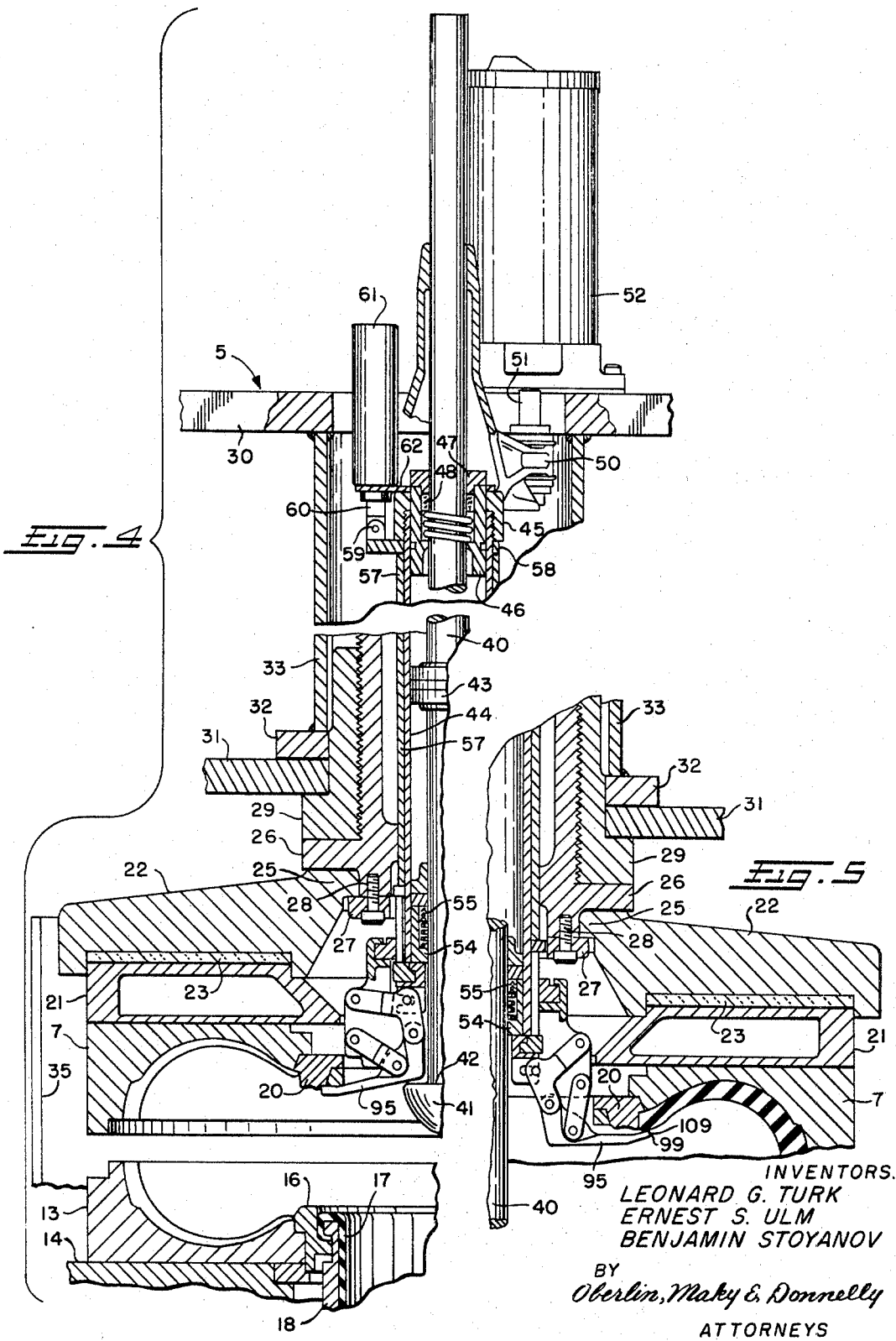

April 23, 1968 L. G. TURK ET AL 3,378,882
LOADER FOR TIRE CURING PRESS
Filed April 1, 1965 5 Sheets-Sheet 4

INVENTORS.
LEONARD G. TURK
ERNEST S. ULM
BENJAMIN STOYANOV
BY
Oberlin, Maky & Donnelly
ATTORNEYS April 23, 1968  L. G. TURK ET AL  3,378,882

LOADER FOR TIRE CURING PRESS

Filed April 1, 1965  5 Sheets-Sheet 5

INVENTORS.
LEONARD G. TURK
ERNEST S. ULM
BENJAMIN STOYANOV

BY

*Oberlin, Maky & Donnelly*
ATTORNEYS

United States Patent Office 3,378,882
Patented Apr. 23, 1968

3,378,882
LOADER FOR TIRE CURING PRESS
Leonard G. Turk, Akron, Ernest S. Ulm, Stow, and Benjamin Stoyanov, Akron, Ohio, assignors to NRM Corporation, Akron, Ohio, a corporation of Ohio
Filed Apr. 1, 1965, Ser. No. 444,530
8 Claims. (Cl. 18—2)

ABSTRACT OF THE DISCLOSURE

A self-loading tire curing press incorporating a loading mechanism in one of the mold sections first placing the green tire in registry with the mold section incorporating the loader and then moving the mold section with the green tire in registry therewith until the green tire comes into registry with the other mold section; closing the press to shape and cure the green tire and then utilizing the loading mechanism to strip the cured tire from the mold sections.

This invention relates generally as indicated to a tire curing press and more particularly to a tire curing press incorporating therein an improved press loading mechanism.

Tire presses have heretofore been loaded by hand and by a variety of so-called automatic loading mechanisms which position the tire to be cured on the bottom mold section of the press. In a hand loading operation, the operator might toss a cylindrical green tire over an upstanding bladder forming mechanism, if the press is provided with such, and then manually shove the green tire downwardly to be in proper registry with the bottom mold section. Further manual positioning of the tire may be required, especially for larger tire sizes, as the press closes to ensure that the tire is in proper registry with the upper mold section.

In the so-called automatic press loading mechanisms, the tire to be cured is positioned in registry with the bottom mold section by placement or dropping, but still may require manual shoving or tugging, especially when dropped and also especially in the case of larger tires, to be properly registered with the upper mold section as the press closes. For an example of the more sophisticated press loading mechanisms currently in wide use in the tire industry, reference may be had to Mallory et al. U.S. Patent No. 3,065,499 and the copending application of Heston et al., Ser. No. 298,152, filed July 29, 1963, entitled "Tire Curing Press and Loader Therefor," now Patent No. 3,229,329. Both of the above illustrate loader mechanisms which have met with wide commercial success in use with the widely known "Autoform" tire curing pres manufactured and sold by the NRM Coropration of Akron, Ohio.

In the above copending application, the green tire is lifted by its upper bead from a loading stand in the front of the press and held in position in registry with the bottom mold section as the tire forming bladder is inflated therein. However, it will be appreciated that the loading mechanism requires substantial complex machinery to lift the green tire from the stand and then place the same in proper registry with the lower mold section. The loader mechanism must then be removed before the press can close upon the tire held by the forming bladder.

With the present invention there has been developed what may be termed a self-loading press wherein the loading mechanism is incorporated in the press itself and does not require complex and space consuming mechanisms mounted on or adjacent the press. Moreover, with the loading mechanism of the present invention, the green tire is first brought into registry with the upper mold section and the closing movements of the press are then utilized to register the green tire with the lower mold section.

It is accordingly a principal object of the present invention to provide a self-loading tire curing press requiring no complex space consuming loading mechanism.

A further principal object is the provision of a tire press which incorporates a loading mechanism which will lift a green tire into registry with the upper mold section while the press is open for loading.

Another object is the provision of a tire curing press having built therein an expansible plate type chuck adapted to engage beneath the upper bead of a green tire and position and center the same in proper registry with both the upper and lower mold sections.

A further object is the provision of a tire curing press including a tire loading chuck built into the upper mold section which also may be employed to strip the tire from the lower mold section after the curing cycle and unload the press.

Yet another object is the provision of a self-loading press providing improved centering of the tire with respect to both the upper and lower mold sections as well as improved centering of the bladder in the tire.

Still another object is the provision of a tire curing press with the above improved loading features which does not require an accessory loading mechanism or attachment.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 4 is a fragmentary broken vertical section of the press in its substantially closed position illustrating the various operating mechanisms for the tire chuck;

FIG. 5 is a fragmentary vertical section similar to FIG. 4 illustrating the press in its closed position and the chuck moved to underlie the upper bead of the tire prior to unloading with the ram extended inverting the bladder.

The tire press

Figure 6:
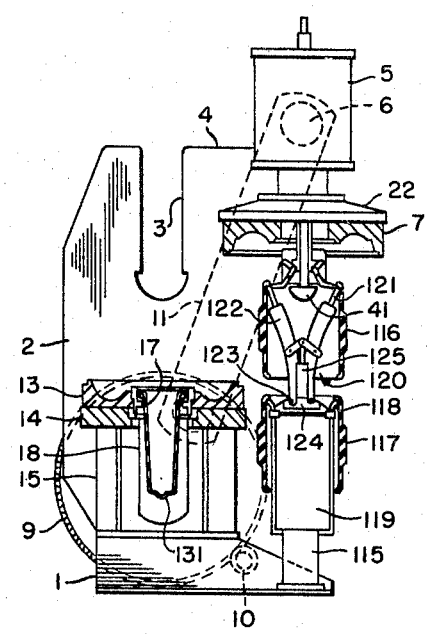
FIGS. 6 through 16 are schematic vertical sections of the press illustrating the various steps in a complete cycle of operation.

The basic press design may be that of the aforementioned widely known "Autoform" press and is perhaps best illustrated in FIG. 6. Referring to such figure, it will be seen that the press comprises a base 1 having at the sides thereof a pair of upstanding plates 2 each having a vertical guide slot 3 therein communicating with the top edge 4. The press head or beam 5 which extends between the upstanding plates 2 is supported for horizontal and vertical movement along the surface 4 and slot 3, respectively by rollers 6. The upper mold section 7 or mold sections, if the press is of the dual type having side-by-side molds, is pendantly mounted beneath the beam or head 5. Movement of the press head through the vertical and then lateral movements required to open the press as shown in FIG. 6 is obtained by a pair of bull gears 9 mounted on each side of the press which may be driven for rotation through motor driven gear reducers driving pinions 10 in mesh with the bull gears. The bull gears are connected to the press head by means of side links 11 so that as the bull gears rotate, the head 5 will be moved in a fashion guided by the surfaces 3 and 4 of the side plates 2. It can be seen then that the press will be opened to the position shown in FIG. 6 by a clockwise rotation of the bull gears 9 and will be closed by a counterclockwise rotation thereof. The bottom mold section 13 is mounted on platen 14 on top of the frame 15 secured to the base 1.

Referring now additionally to FIG. 4, it will be seen that the bottom mold section 13 is provided with an annular toe ring 16 which has clamped to the interior thereof the annular edge of a forming bladder 17 which when the press is opened will be invaginated into well 18 in the bottom mold section. The frame 15 supporting the bottom mold section. The well 18 may be mounted for limited vertical movement to facilitate the clamping and unclamping of the upper edge of the bladder 17 so that the bladder may be quickly changed when required. The aforedescribed basic press design is conventional and reference may be had to the aforementioned Mallory et al. Patent No. 3,065,499 and additionally to Mallory et al. Patent No. 3,097,394 for more detailed illustrations of such press.

Referring further to FIG. 4, it will be seen that the upper mold section 7 is provided with a toe ring 20 vis-a-vis the toe ring 16 of the lower mold section 13 in the closed position of the press. Situated above the upper mold section 7 is a steam platen or chamber 21 which is in turn secured to the bolster plate 22 with a layer of insulation 23 being provided therebetween. The bolster plate 22 includes an inwardly directed annular flange 25 which fits within a downwardly projecting shoulder of large annular adjusting screw 26. The flange 25 is retained within such shoulder by ring 27 secured to the bottom of the screw by fasteners 28. The screw 26 is in threaded engagement with large nut 29 which is in turn secured to the box section fabricated beam or head 5. Such beam may include top and bottom plates 30 and 31, the ring 32, and an upstanding reinforcing member 33 surrounding the nut 29. It will thus be seen that rotational adjustment of the screw 26 within the nut 29 may be employed vertically to adjust the position of the top mold 7 so that the press may accommodate molds of different sizes.

An upstanding heat shield 35 may be provided projecting from the platen 14 to surround the mold sections as the press closes for retention of heat.

*The tire chuck*

Referring now more particularly to FIGS. 1 through 5, it will be seen that there is mounted in the press head concentric with the upper mold section 7 a bladder ram 40 having a hemispherical nose 41 on the lower end thereof having a diameter substantially larger than that of the ram providing an upwardly facing shoulder 42. The bladder ram 40 is provided with a piston 43 confined within tire stripping tube 44. The upper end of the tire stripping tube 44 is threadedly connected to cap 45 in which is secured sleeve 46 having a retaining ring 47 on the end thereof. The bladder ram 40 passes through the sleeve 46 and ring 47 with a spring loaded packing gland 48 slidingly sealing the bladder ram 40 in the upper end of the tire stripping tube 44. The cap 45 is connected at 50 to the rod 51 of piston-cylinder assembly 52 mounted on the top plate 30 of the head 5.

The lower end of the tire stripping tube 44 is closed about the ram 40 by sleeve assembly 54 having spring loaded packing gland 55 therein. It can thus be seen that variations in pressure within the tire stripping tube 44 on the opposite sides of the piston 43 will cause the bladder ram 40 having the nose 41 on the end thereof to extend and retract.

Surrounding the tire stripping tube 44 is a chuck sector plate actuator tube 57, the top of which is provided with a stop plate 58 having a lateral extension connected at 59 to the rod 60 of piston-cylinder assembly 61. The rod end of the piston-cylinder assembly 61 is mounted on a bracket plate 62 secured to the cap 45 and, of course, movable therewith. It can now be seen that extension of the piston-cylinder assemblies 61 will cause the chuck sector plate actuator tube 57 to move downwardly with respect to the tire stripping tube 44.

Figure 1:
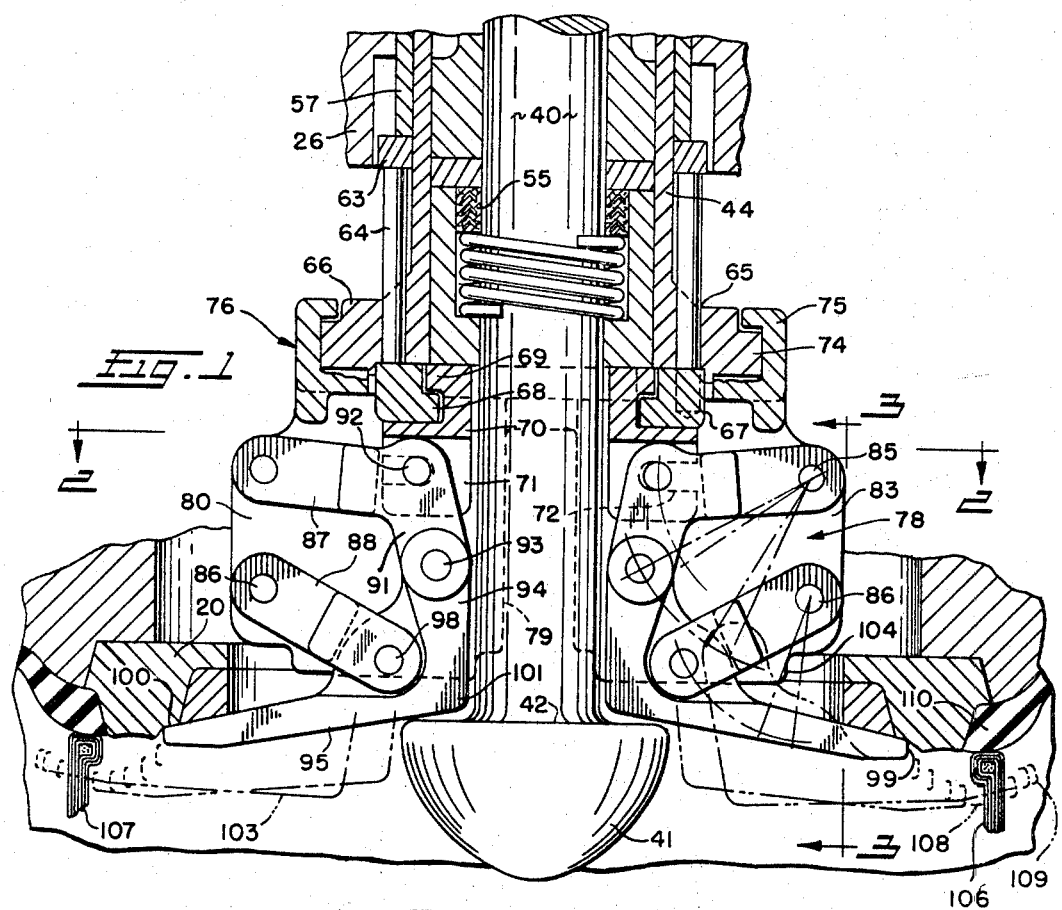
FIG. 1 is an enlarged fragmentary vertical section taken through the chuck mechanism in the upper mold section of the press.

Referring now more particularly to FIG. 1, it will be seen that the lower end of the sector plate actuating tube 57 is provided with a ring 63 and four quadrant spaced vertically extending rods 64 project downwardly from the ring 63 through apertures 65 in flange 66 extending radially from the bottom of the tire stripping tube 44. A further ring 67 having inwardly directed lower shoulder 68 thereon is mounted on the lower ends of the rods 64. The inwardly directed shoulder 68 interfits with an outwardly directed shoulder 69 on ring 70 which is provided with four quadrant spaced downwardly extending projections 71 having horizontal slots 72 in the outer edges thereof.

Figure 2:
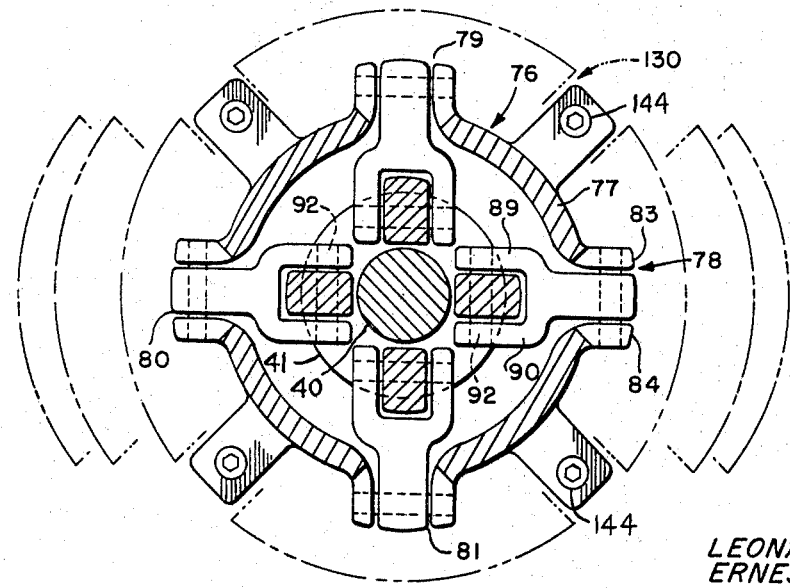
FIG. 2 is a fragmentary horizontal section taken substantially on the line 2—2 of FIG. 1 showing the various positions obtainable by the chuck sectors.
Figure 3:
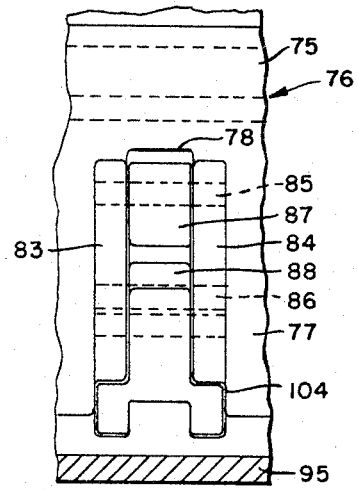
FIG. 3 is a fragmentary vertical section taken substantially on the line 3—3 of FIG. 1.

The flange 66 on the lower end of the tire stripping tube 44 includes an outwardly projecting shoulder or flange 74 which is enclosed by the upper U-shaped annular upper portion 75 of housing 76. The housing 76 includes an annular depending skirt portion 77 provided with four quadrant spaced vertical slots 78, 79, 80 and 81 as seen in FIG. 2, each of which is provided with vertical marginal flanges 83 and 84. Pivotally mounted on vertically spaced pins 85 and 86 extending between each of the pair of flanges are yoke links 87 and 88, respectively. The upper link 87 of each pair of links includes an inner bifurcated portion providing legs 89 and 90 which include elbows therein providing downwardly offset end portions 91. A pin 92 extends between the legs at the upper end of the offset portion and such pin of each link 87 is confined within the horizontal slot 72 of the respective downwardly extending projections 71 on the ring 70. The lower ends of the offset portions 91 of the legs 89 and 90 are connected by pin 93 to the upper end 94 of the respective chuck sector plates 95. The lower links 88 of each pair include inner bifurcated portions providing legs which straddle webs 97 provided in the throat of each sector plate and are connected by pins 98 thereto. The sector plates 95 which form the chuck segments are provided with circular outer edges 99 which nest in recess 100 in the upper toe ring 20 in the fully retracted position of the chuck. The heel of the sector plates 95 shown at 101 fits closely within the upwardly extending shoulder 42 provided by the nose 41 of the ram 40 when the latter is retracted. The ram, of course, may be extended slightly to permit the chuck sector plates to swing to their open, tire engaging, positions. The planar outline as well as the positions obtainable by the chuck sector plates 95 are shown in phantom line position in FIG. 2.

It can now be seen that vertical movement of the chuck sector plate actuating tube 57 with respect to the tire stripping tube 44 will cause the chuck sector plates 95 to swing to the phantom line positions indicated at 103 in FIG. 1. The extent of such relative vertical movement of the two tubes 57 and 44 will, of course, control the tire engaging diameter of the chuck segments in their extended position. It is noted that the slots 78 through 81 at their lower ends may be cut-away as indicated at 104 to permit the bifurcated lower links 88 of each pair to swing to the almost vertical position required in the maximum extension of the sector plates.

Referring further to FIG. 1, it will be seen that the sector plates 95 may thus be caused to extend beneath the upper bead 106 of the green tire 107 shown. The edges 99 of the sector plates will then move beneath the slight inwardly directed shoulder of the upper bead 106 which is characteristic of green tires. It will be appreciated that in preformed tires or in shoulder built truck tires, the shoulder provided at the upper bead may be even greater. Also, it can be seen that as the edges 99 of the chuck sector plates engage the green tire, they will automatically center the upper bead 106 with respect to the top toe ring 20. In the case of preformed or C-shape tires, the top of the sector plates may be provided with a centering ridge or shoulder to engage the upper bead. Thus for picking up the green tires, the chuck sector plates would be extended to the phantom line position shown at 108 for the edge 99. However, to strip the molded tire from the press, the chuck sector plates would normally be extended even further to the phantom line position shown at 109 for the edges 99 more fully to underlie the molded bead 110 of the shaped tire.

*Tire press operational cycle*

Referring now to FIG. 6, it will be seen that the tire press may be situated such that the press head 5 moves upwardly through the slot 3 and forwardly along the top guide surface 4 of the side plates 2 to position the head and the mold 7 pendantly supported therebeneath in a forwardly offset manner clearing the lower mold 13 for overhead loading. In conventional "Autoform" presses, the upper mold section moves upwardly and rearwardly to expose the lower mold section for loading. On the contrary, as seen in FIG. 6, the right hand side of the press as shown may be considered the front of the press and the left hand side the rear.

A stand 115 may be mounted at the front of the press to support green tires 116 and 117 in a vertically stacked relation for loading into the mold formed by the upper and lower mold sections 7 and 13. In this manner, the operator may place two green tire carcasses ahead of each mold to obtain what is known as a "random" cure. The stand may included lower radially projecting spring latch fingers 118 adapted to engage the upper bead of the carcass or green tire 117 in much the same manner as disclosed in the stand of the aforementioned copending Heston et al application. Supported on a pneumatic cylinder indicated generally at 119 is a vertically movable upper stand 120 which also includes a plurality of spring latch bead engaging fingers 121 mounted on arms 122 which are pivoted at 123 to the movable base 124 of the upper stand. Pivoting movement of the arms 122 about the proximal pivots 123 may be obtained by the piston-cylinder assembly 125 radially to move the arms 122. With such arms 122 in their radial innermost positions, the operator may then telescope a green tire carcass 117 over the upper stand and cause the same to be seated in the manner shown on the fingers 118 to be suspended in a telescoping manner about the cylinder assembly 119 suspended from the upper bead. Retraction of the piston-cylinder assembly 125 may then be employed radially to move the arms 122 outwardly so that the second green tire 116 may then be telescoped over the arms to be caught by its upper bead in the suspended position from the fingers 121. In this manner, two tires may then be placed in front of each mold.

Figure 7:
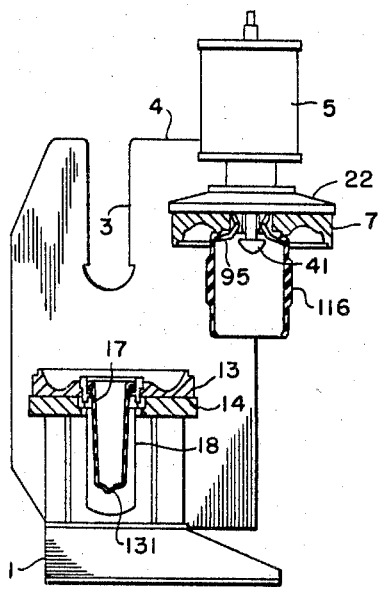

As the press opens, the top mold section moves upwardly and then laterally to the position shown in FIG. 6 and it will be appreciated that the axis of the upper mold section 7 will be maintained in a vertical position by an auxiliary cam slot in the plates 2 and a guide secured to the press head. Reference may be had to the aforementioned Mallory et al. Patent No. 3,065,499. When the upper mold section is in the position shown in FIG. 6, the piston-cylinder assembly 52 mounted on the press head 5 will be caused to be extended to position the chuck sector plates 95 within the upper end of the green tire 116 beneath the upper bead thereof. Now, the piston-cylinder assembly 61 is caused to extend moving the sector actuating tube 57 downwardly with respect to the tire stripping tube 44 causing the chuck sector plates to swing outwardly to the intermediate position shown in phantom lines in FIGS. 1 and 2. At such position, the outer edges 99 of the chuck sector plates will engage beneath the upper bead of the green tire and will center such upper bead with respect to the upper mold section. As seen in FIG. 2, the space 130 between the sector plates will interfit with the fingers 121 supporting the green tire 116 by its upper bead. With the chuck sector plates in proper engagement with the upper bead of the green tire 116, the piston-cylinder assembly 125 may now be extended retracting the arms 122 and the piston-cylinder assembly 52 may now be retracted lifting the entire chuck assembly to seat the upper bead of the green tire 116 in proper registry with the toe ring of the upper mold section as seen in FIG. 7. At this time, the piston-cylinder assembly 119 may now be retracted lowering the arms 122 to position the fingers 121 thereon horizontally in alignment with the latch fingers 118 to grip the upper bead of the lower green tire 117 to elevate the same for loading during the next cycle.

Figure 8:
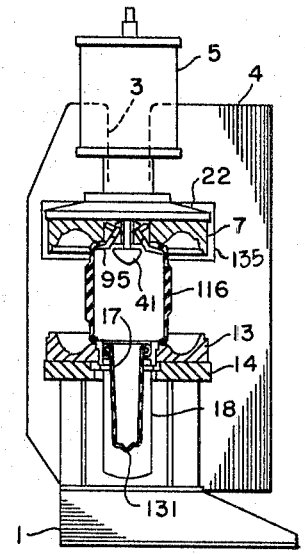
Figure 9:
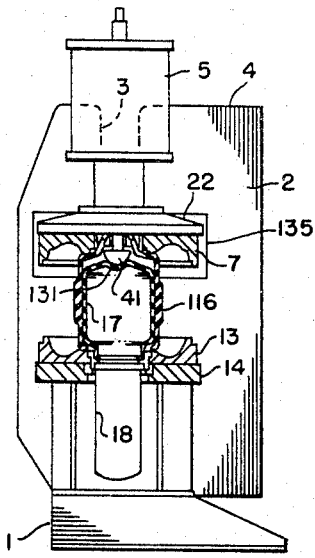

Moving on now to FIGS. 7 and 8 with the green tire 116 suspended by the chuck segments and in registry with the toe ring of the upper mold section, the press then begins to close. The press head 5 moves laterally along the guide surface 4 and then vertically downwardly within the slots 3 and may seat the green tire 116 in registry with the toe ring 16 of the bottom mold section as seen in FIG. 8. The press at this time stops its closing movements and pressure is now supplied to the interior of the well 18 causing the bladder 17 to extend upwardly into the green tire. The bladder under medium pressure engages the interior of the green tire and now holds the same in its registered position as seen in FIG. 9.

Figure 10:
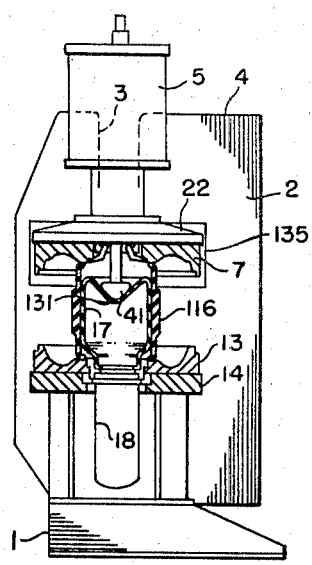

At this time, the stripping ram 40 extends downwardly approximately six inches and the piston-cylinder assembly 61 is then fully retracted moving the actuator tube upwardly with respect to the tire stripping tube 44 causing the ring 67 to seat against the bottom of the flange 66 as seen in FIG. 1 retracting the sector plates 95 into the recess 100 as seen in FIG. 10.

Figure 11:
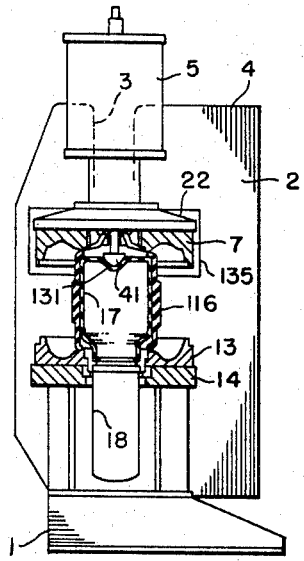
Figure 12:
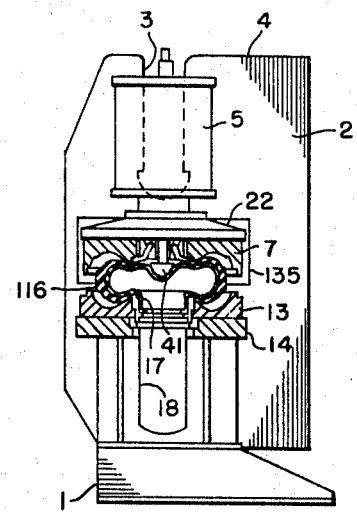
Figure 13:
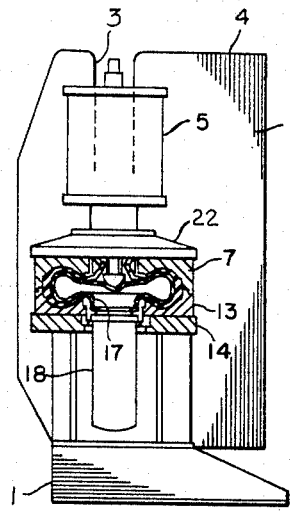
Figure 14:
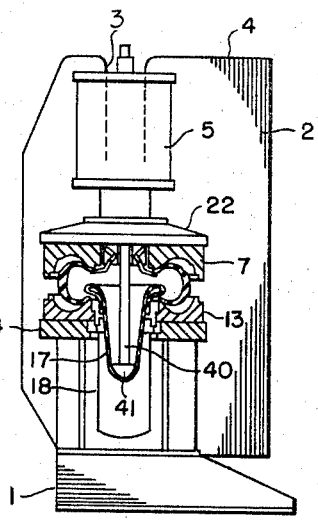

The stripping ram is now retracted and the nose 41 thereof will engage within a molded recess 131 in the bladder assisting in the centering of the bladder with respect to the mold sections and green tire. The pressure within the bladder is now increased when the stripping ram is retracted as seen in FIG. 11 and the press now continues its closing operation with the press head and top mold section descending to shape the tire as seen in FIG. 12. The press then closes fully as seen in FIG. 13 and remains in such position during the curing cycle.

Figure 15:
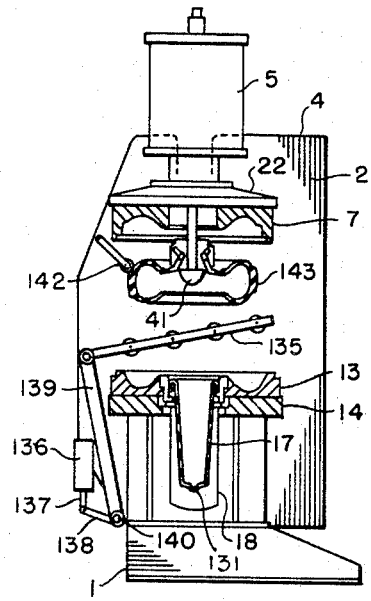

After the timer indicates the completion of the curing cycle, the opening cycle begins with the stripping ram 40 extending downwardly and simultaneously the sector plates extending to the phantom line position 109 shown in FIG. 1 underlying the upper bead of the tire. The extension of the sector plates is, of course, accomplished by the extension of the piston-cylinder assembly 61. The ram 40 continues downwardly to invaginate the bladder 17 back into the well 18 and the press begins to open. As the press opens, the stripping ram 40 is elevated, but the sector plates 95 continue to underlie the upper bead of the cured tire. When the press head has reached a position at the top of the slot 3, the inclined discharge conveyor 135 may be pivoted into position by piston-cylinder assembly 136 as seen in FIG. 15. The rod 137 of the assembly 136 is connected to crank arm 138 pivoting arm 139 about the pivot 140. When the discharge conveyor is properly thus positioned, the piston-cylinder assembly 52 may be extended permitting stripping bar 142 to move above the shaped tire indicated at 143 stripping the same from the upper mold section 7. It will be appreciated that the top toe ring 20 can be mounted for movement with the segment housing 76 as by the fasteners 144 seen in FIG. 2 to ensure proper stripping of the tire from the upper mold section as the piston-cylinder assembly 52 is energized.

Figure 16:
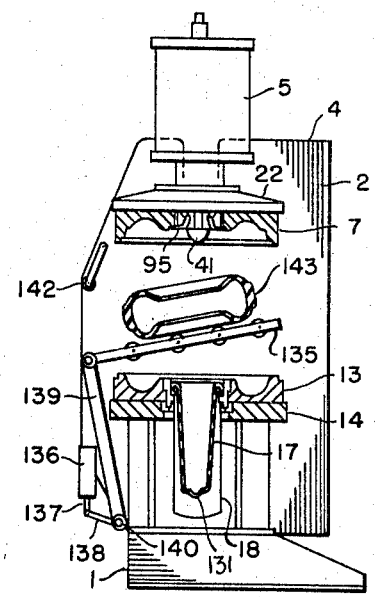

Now referring to FIG. 16, the piston-cylinder assembly 61 may be retracted to pull the sector plates back into the recess in the toe ring permitting the tire to drop onto the discharge conveyor 135. The tire may then slide into a post cure inflating machine or onto a take-away conveyor normal to the plane of FIG. 16. When the cured tire has cleared the press, the discharge conveyor 135 will be pivoted out of the way and the press head will move back to the position shown in FIG. 6. The fingers 121 on the arms 122 now engaging the top bead of the green tire 117 will then be elevated to position the next green tire to be gripped by the sector plates as in FIG. 6. The cycle of operation is then repeated. While the next green tire is curing, the operator may then recharge the stand 115 with two additional green tires.

It can now be seen that there is provided a tire curing press wherein the green tire is brought into proper registry with the upper mold section by the loading sectors and the closing movement of the press then properly registers the tire with the lower mold section to receive the bladder inflated therein. In this manner, it is ensured that both the tire and the bladder will be properly centered in the press prior to closing every time. It will also be appreciated that the radial movement of the chuck sectors may vary to accommodate tires having a wide variety of bead sizes. Also, instead of a vertically indexed two tire stand, horizontal indexing may be employed to position the tire for gripping by the sector plates.

Other modes of applying the principle of the invention may be employed, change being made as regards the details described, provided the features stated in any of the following claims or the equivalent of such be employed.

We, therefore, particularly point out and distinctly claim as our invention:

1. A tire press comprising a stationary and a movable mold section, a green tire loader within said movable mold section; said loader including means operative to grip a green tire and means operative to move such green tire after it has been gripped to place it in concentric registry with said movable mold section, and means operative to move said movable mold section with such green tire in concentric registry therewith to translate the position of such green tire to bring such green tire and said movable mold section into concentric registry with said stationary mold section and to close said press.

2. A tire curing press as set forth in claim 1 wherein said loader is mounted coaxially within said movable mold section and comprises a plurality of substantially flat sector plates, and means operative radially to move said plates to grip the interior of such green tire with the outer edges of said plates.

3. A tire curing press as set forth in claim 2 including a forming bladder mounted in said stationary mold section, means operative to expand said forming bladder to grip such green tire when in concentric registry with said stationary mold section, and means operative to retract said plates to release such green tire for shaping and curing.

4. A tire curing press as set forth in claim 2 including a pair of links for each sector plate supporting the same for movement radially outwardly and downwardly to grip the interior of such green tire.

5. A tire curing press as set forth in claim 4 including an inner tube supporting said loader for movement axially of said movable mold section, an outer tube surrounding said inner tube and connected to one link of each pair operative to move said plates radially upon relative movement of said tubes.

6. A tire curing press as set forth in claim 1 wherein said movable mold section is movable away from and then laterally of said stationary mold section to open said press, and a stand in axial alignment with said movable mold section when said press is open operative to support a green tire to be picked up by said loader.

7. A tire curing press as set forth in claim 6 wherein said loader comprises a plurality of radially movable substantially flat plates adapted to grip such green tire with the outer edges thereof beneath the upper bead, said stand comprising a plurality of upper bead engaging fingers, said plates and fingers interfitting as the green tire is transferred from said stand to said loader.

8. A tire curing press as set forth in claim 1 wherein said loader comprises a plurality of radially movable plates, means operative to move said plates radially to an intermediate position to grip the green tire internally at the upper bead thereof for loading, and to a further radially extended position to underlie the cured tire within such press to facilitate stripping thereof from said stationary mold section.

References Cited

UNITED STATES PATENTS

| | | | |
|---|---|---|---|
| 2,959,815 | 11/1960 | Brundage | 18—17 |
| 2,997,738 | 8/1961 | Soderquist | 18—2 X |
| 3,065,499 | 11/1962 | Brundage et al. | 18—2 |
| 3,065,503 | 11/1962 | Mallory et al. | |
| 3,097,394 | 7/1963 | Mallory et al. | 18—2 X |
| 3,134,136 | 5/1964 | Soderquist | 18—2 |
| 3,167,810 | 2/1965 | Soderquist | 18—2 |
| 3,222,715 | 12/1965 | Harris | 18—2 |
| 3,229,329 | 1/1966 | Heston et al. | 18—2 |
| 3,260,782 | 7/1966 | Soderquist | 18—17 X |
| 3,267,515 | 8/1966 | Ulm | 18—2 |

J. HOWARD FLINT, JR., *Primary Examiner.*